United States Patent
Hennessy et al.

(10) Patent No.: US 7,091,799 B1
(45) Date of Patent: Aug. 15, 2006

(54) HYBRID BYPASS NETWORKS FOR LOW-LOSS CABLES AND RIPPLE FILTER CHOKES

(76) Inventors: Michael J. Hennessy, 9 Patroon Pl., Ballston Lake, NY (US) 12019; Eduard K. Mueller, 95 Sweet Rd., Ballston Lake, NY (US) 12019

( * ) Notice: Subject to any disclaimer, the term of this patent is extended or adjusted under 35 U.S.C. 154(b) by 167 days.

(21) Appl. No.: 10/744,402

(22) Filed: Dec. 22, 2003

Related U.S. Application Data

(60) Provisional application No. 60/436,819, filed on Dec. 27, 2002, provisional application No. 60/465,365, filed on Apr. 28, 2003.

(51) Int. Cl.
*H04B 3/28* (2006.01)
*H01B 12/00* (2006.01)
*H02J 1/02* (2006.01)

(52) U.S. Cl. .................... 333/12; 333/99 S; 363/39
(58) Field of Classification Search ............... 333/12, 333/181, 99 S, 99 R; 363/39, 40, 44, 45; 174/125.1; 505/230, 704
See application file for complete search history.

(56) References Cited

U.S. PATENT DOCUMENTS

| | | | |
|---|---|---|---|
| 3,390,357 A * | 6/1968 | Thomson | 333/17.1 |
| 3,586,958 A * | 6/1971 | Kafka | 363/14 |
| 4,027,225 A * | 5/1977 | Elvin | 363/39 |
| 4,099,746 A * | 7/1978 | Kontsch et al. | 285/119 |
| 5,148,359 A * | 9/1992 | Nguyen | 363/48 |
| 5,251,120 A * | 10/1993 | Smith | 363/44 |
| 5,559,396 A * | 9/1996 | Bruning et al. | 315/291 |
| 5,953,224 A * | 9/1999 | Gold et al. | 363/98 |
| 5,990,654 A * | 11/1999 | Skibinski et al. | 318/800 |
| 6,674,321 B1 * | 1/2004 | York | 327/586 |
| 6,801,103 B1 * | 10/2004 | Terakawa et al. | 333/181 |
| 6,867,375 B1 * | 3/2005 | Hughey et al. | 174/125.1 |
| 6,906,265 B1 * | 6/2005 | Snitchler et al. | 174/125.1 |

OTHER PUBLICATIONS

Mukoyama et al., "AC Losses of HTS Power Transmission Cables Using Bi-2223 Tapes with Twisted Filaments," IEEE Trans. on Applied Superconductivity, vol. 11, No. 1, Mar. 2001, pp. 2192-2195.*

* cited by examiner

Primary Examiner—Seungsook Ham
(74) Attorney, Agent, or Firm—Leonard Cooper

(57) ABSTRACT

Losses are reduced in electrical conductors and filters, especially those made with superconducting cables or inductors, which carry currents having both direct current (DC) and alternating current (AC) portions as in rectifier busses and power distribution systems. Superconducting cables and chokes are capable of passing direct current with practically zero losses, but they exhibit considerable AC losses. A low impedance AC bypass of the superconducting cables and chokes minimizes these losses.

15 Claims, 4 Drawing Sheets

HYBRID BYPASS NETWORKS FOR LOW-LOSS CABLES AND RIPPLE FILTER CHOKES

This patent claims the benefit of provisional patent application 60/436,819 filed Dec. 27, 2002 and 60/465,365 filed Apr. 28, 2003.

BACKGROUND OF THE INVENTION

While superconducting devices such as cables and chokes (inductors) are capable of passing direct current with practically zero losses, they do exhibit considerable AC losses. Described here is a method and apparatus for minimizing these losses in applications where current consists of both a DC component and an AC component. This commonly occurs in rectifier busses, power supplies and power distribution systems.

Currents flowing in networks are commonly categorized as either alternating currents (AC) or direct currents (DC). The notion of direct current is misleading, however, and in practice one actually means a current with frequency components below some lower cutoff frequency, usually below the first dominant harmonic of the current. This invention separates these currents in cables and chokes in such a way that one can take advantage of the benefit of superconducting technologies, which work best at very low (DC) frequencies.

SUMMARY OF THE INVENTION

AC ripple currents in power cables are separated from DC currents using impedance bypass circuits similar to that shown in FIG. 1. These DC currents are then carried with zero losses, or at least with very minimal losses, by superconducting cables or by cryogenically operated conventional cables. Most of the AC portion of the current is directed into a secondary line (bypass) specifically designed to pass AC currents efficiently. Efficient AC cables can be regular busses, transposed cables or conventional multi-conductor, multi-strand Litz wire cables or the AC cable may be made of special, low-loss AC superconducting materials or even conventional conductors like copper. The AC bypass can be held at any temperature, including either room temperature (300 K), or at cryogenic temperatures for high performance non-superconducting cables or for superconducting cables. At the end of the transmission line, the AC and DC components of the current are recombined, producing a cable output current equal to the input current. This invention thus reduces the AC component of a current in the superconducting DC cable during transmission, minimizing AC losses. The DC component of the current flows at cryogenic temperature with practically zero losses.

The advantage of this approach is the reduction of AC losses in the superconductors when used in power converters, power supplies, filters, or in power or signal transmission. For example, the AC loss can be borne in the bypass at room temperature, circumventing the need for expensive refrigeration. This also reduces the need for designing exotic superconducting cables when passing both AC and DC currents. Superconductors are usually made as composites with normal metals serving as substrates, etc which are best suited to pass DC currents. AC currents generate eddy currents in the substrates and cause considerable heat loads to the refrigeration system There are many types of AC bypass networks. These networks can be broadband or tuned to various harmonics. Examples are shown in FIGS. 2a and 2b, and in FIGS. 3a, 3b, and 3c. In the cases considered as examples in this application, the DC cable is designed with sufficient inductance to provide impedance to the current at high frequencies. There are several common approaches in forming cable inductance. A long co-axial line has some self-inductance, which may be enhanced by ferrites or highly inductive materials, if necessary. The DC cable may also be a conductor wound around a long inductive core material. Highly permeable beads may be added to a single, long conductor. A long, air-core inductor may also be used. Separate inductors may be added in series at one end or both ends of a DC line. There are many circuits which can be used for either the AC or the DC bypass networks. Where several cables are involved, they may be wrapped around a common core, depending on the details of the circuit.

The AC bypass network is designed to have lower impedance than the DC inductive cable at the frequency of interest (The frequency of interest is determined by the application. For example when passing a rectified current, the frequency of interest is the first harmonic of the waveform, e.i. the first harmonic of the AC ripple). The crossover frequency, defined here as the frequency at which the currents are equal, is selected to be much lower than the first harmonic of the AC waveform. A simple, single-pole bypass circuit includes an AC cable in parallel with the DC inductive cable as shown in FIG. 2a. The crossover frequency is roughly equal to R/L. Cryogenic leads or thermal transitions are required if the AC cable is at a higher temperature than the cryogenic DC cable, as shown in FIG. 2b.

In some cases, it is advantageous to block off all DC current in the AC bypass cable. This is accomplished by adding a capacitor in series with the bypass cable as shown in FIGS. 3a, 3b and 3c. The capacitor can be at room temperature or at low temperatures. The advantages of using capacitors at low temperature or cryogenic temperatures include higher energy density, improved voltage capability, lower equivalent series resistance, higher quality factor, lower dissipation factor, improved frequency response, and improved current capability. The AC cable can be at any temperature, but it may be best to bring the AC losses to room temperature in order to reduce the refrigeration requirement. Cryogenic leads may be required to span the thermal transitions of each device. The DC cable, a superconducting cable, must be operated below its critical temperature. The capacitor may be used at whatever temperature is most accommodating in the design.

A similar strategy can be applied for minimizing AC losses in superconducting chokes used in filter networks for power systems. In these applications the current consists of both a DC part and an AC part.

Here, two coils are used instead of two cables, an "AC coil" and a "DC coil" connected in parallel as shown in FIG. 4. The AC coil is an inductive coil fabricated with conductors (not necessarily superconductors). The impedance of the AC coil dominates the circuit at frequencies higher than the ripple frequency, providing a lower impedance path but still acting as a choke. The DC coil is a superconducting coil, which is designed with a much higher inductance than the AC coil. The DC coil passes the DC current and blocks the ripple current and its harmonics above the ripple current frequency. The majority of the AC ripple current passes in the AC coil, which absorbs most of the AC loss. This coil can be held at any temperature, including either room temperature (300 K) or low or cryogenic temperature (ie., 77 K). The remaining portion of the current (mainly DC) flows into the DC coil, which is held at a temperature below the critical temperature of the superconducting material and therefore has essentially no resistance to DC.

The AC component of the ripple current is mostly removed from the superconducting DC coil, thereby minimizing AC losses in the superconductor. The DC current is conducted with practically zero losses. For applications where the power circuits are operated at low temperatures, if the AC coil is at room temperature, only the AC ripple current must be passed through a cryogenic lead, providing a low loss thermal transition from cryogenic to room temperature. In many cases, especially where there is a small AC current riding on a high DC current, this separation of currents reduces the overall heat loads associated with a choke inductor wound with superconductor material. The AC coil does not have to be held at room temperature but it is usually advantageous to do so to reduce refrigeration loads, even with thermal transitions.

DESCRIPTION OF PREFERRED EMBODIMENTS

Figure 1:
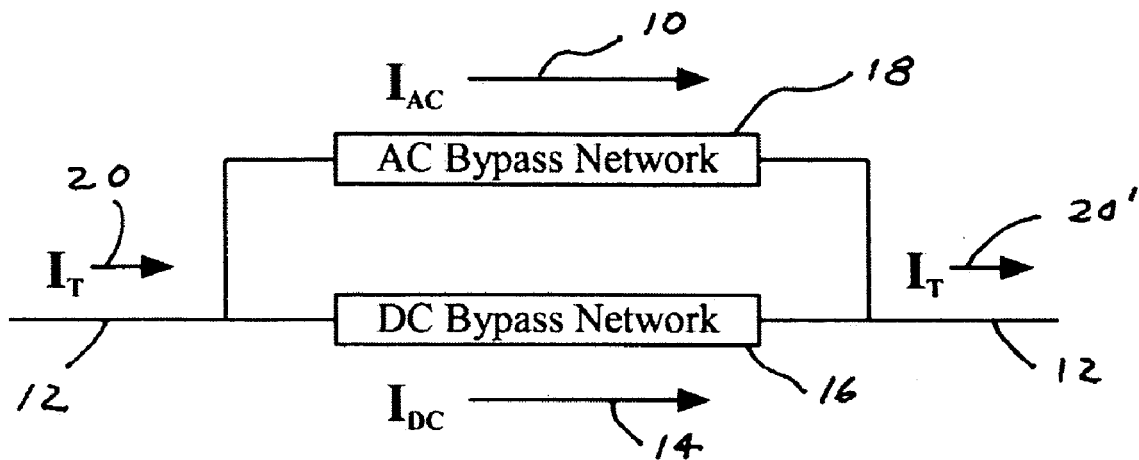
FIG. 1 illustrates a hybrid bypass network in accordance with the invention.

AC ripple currents 10 in power cables 12 or transmission lines are separated from DC currents 14 using impedance bypass circuits similar to that shown in FIG. 1. These DC currents 14 are then carried with zero losses, or at least with very minimal losses, by superconducting cables 16 designed with impedance to minimize the passage of AC currents or by cryogenically operated conventional cables. Most of the AC portion 10 of the current is directed into a secondary line (bypass) 18 specifically designed to pass AC currents efficiently. Efficient AC cables can be regular busses, transposed cables or conventional multi-conductor, multi-strand Litz wire cables or the AC cable may be made of special, low-loss AC superconducting materials or even conventional conductors like copper. The AC bypass 18 can be held at any temperature, including either room temperature (300 K) or cryogenic temperatures for high performance non-superconducting cables and for superconducting cables. At the end of the transmission line 12 the AC and DC components 10, 14 of the current are recombined, producing a cable output current 20 equal to the input current 20.

This invention thus reduces the AC component 10 of a current 20 in the superconducting DC cable 16 during transmission, thereby minimizing AC losses. The DC component 14 of the current 20 is transmitted at cryogenic temperature with practically zero losses.

The advantage of this approach is the reduction of AC losses in the superconductors when used in power applications. For example, the AC loss can be borne in the bypass at room temperature, circumventing the need for expensive refrigeration. This also reduces the need for designing exotic superconducting cables. (Superconductors are usually made as composites with normal metals serving as substrates, etc.)

Figure 2A:
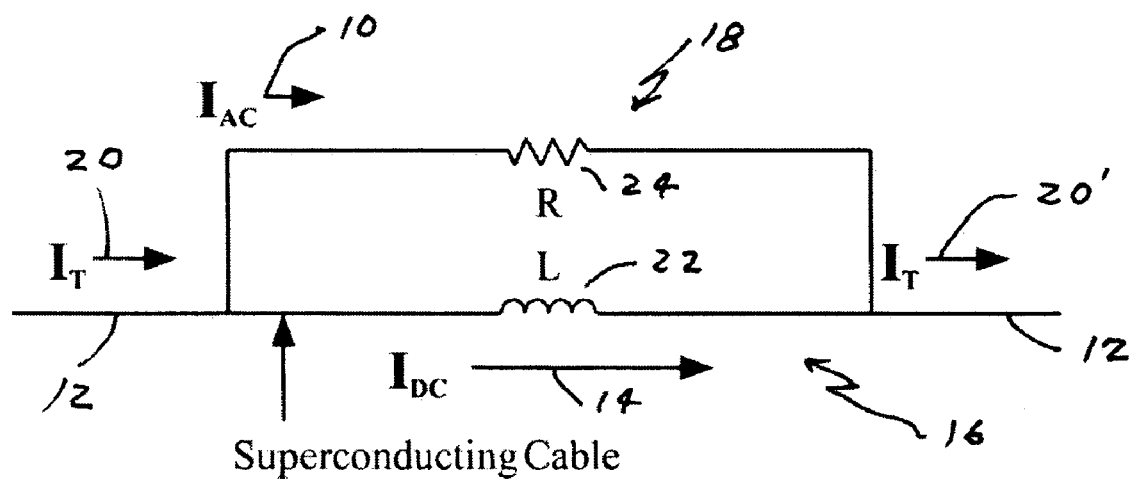
FIG. 2a is a hybrid bypass cable network embodiment of the invention using a resistor in parallel with an inductive superconducting cable at the same temperature.
Figure 2B:
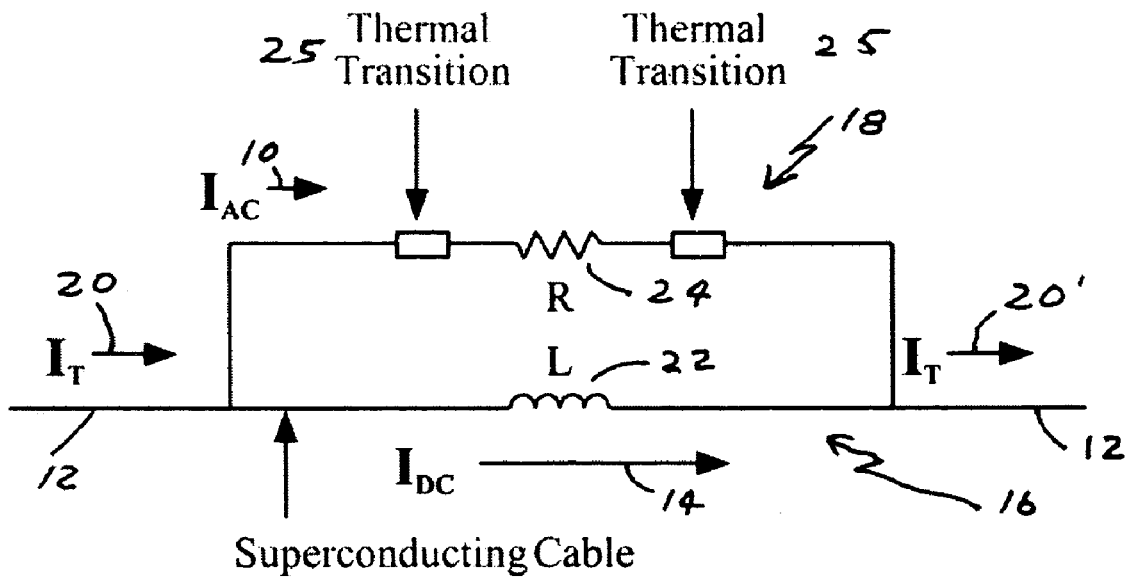
FIG. 2b is a variation of FIG. 2a providing the hybrid bypass cable network in accordance with the invention using a warm resistor in parallel with a cold inductive superconducting cable.

There are many types of AC bypass networks 18. These networks can be broadband or tuned to various harmonics. Examples are shown in FIGS. 2a and 2b, and in FIGS. 3a, 3b, and 3c. In the cases considered as examples in this application, the DC cable 16 is designed with sufficient inductance 22 to provide impedance to the current 20 at high frequencies.

There are several common approaches in forming cable inductance. A long co-axial line has some self-inductance, which may be enhanced by ferrites or highly inductive materials, if necessary. The DC cable may also be a conductor wound around a long inductive core material. Highly permeable beads may be added to a single, long conductor. A long, air-core inductor may also be used. Inductors may be added in series at one end or both ends of a DC line 16. Thus, there are many methods of modifying the impedances of both the AC and DC bypasses. Where several cables are involved, they may be wrapped around a common core, depending on the details of the circuit.

The AC bypass network 18 is designed (FIG. 2a) to have lower impedance than L of the DC inductive cable 16 at the frequency of interest (in this case, the first harmonic of the AC ripple). The crossover frequency, defined here as the frequency at which the currents 10,14 are equal, is selected to be much lower than the first harmonic of the AC waveform. A simple single-pole bypass circuit includes an AC cable in parallel with the DC inductive cable 16 as shown in FIG. 2a. The crossover frequency is roughly equal to R/L where R is the resistance of the AC cable. Cryogenic leads or thermal transitions 25 are required if the AC cable 18 is at a higher temperature than the cryogenic DC cable 16, as shown in FIG. 2b.

A thermal transition such as a cryogenic lead, known in the art, is an electrical lead designed with special materials and cooling means to minimize the heat flowing between two circuits at different temperatures for example where a room temperature bypass 18 connects to the DC superconductor 16 at cryogenic temperature such as 77 K. (FIG. 2b) The lead is optimized so a minimized heat load is imposed on the cryogenic refrigeration system by its connection to the higher temperature AC bypass. The thermal transition, in the case of cryogenics is known as a cryogenic lead low loss lead, or vapor cooled lead is commercially available, for example, from American Magnetics, Oak Ridge, Tenn.

Figure 3A:
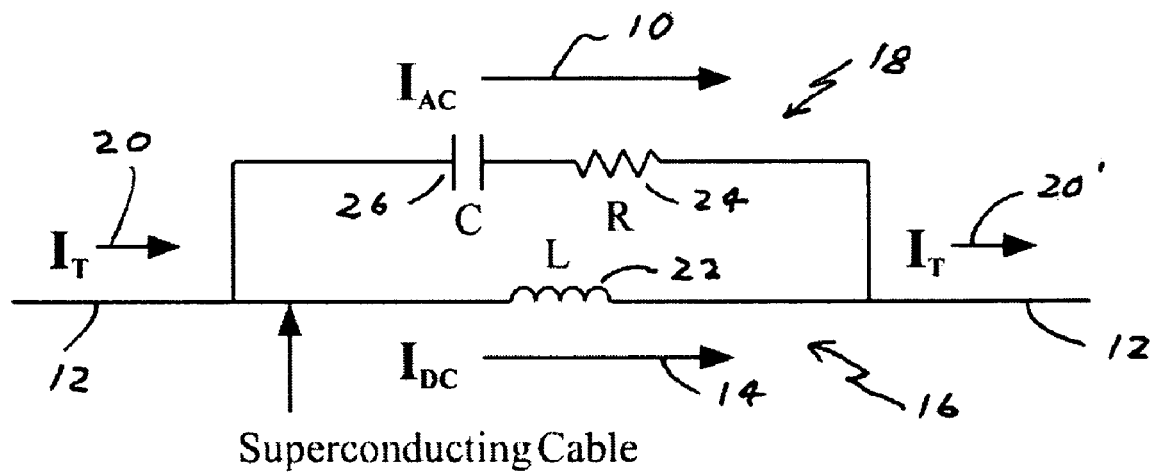
FIG. 3a is another hybrid bypass cable network embodiment of the invention using a capacitor in series with a resistor, both of which are parallel-connected to an inductive superconducting cable.
Figure 3B:
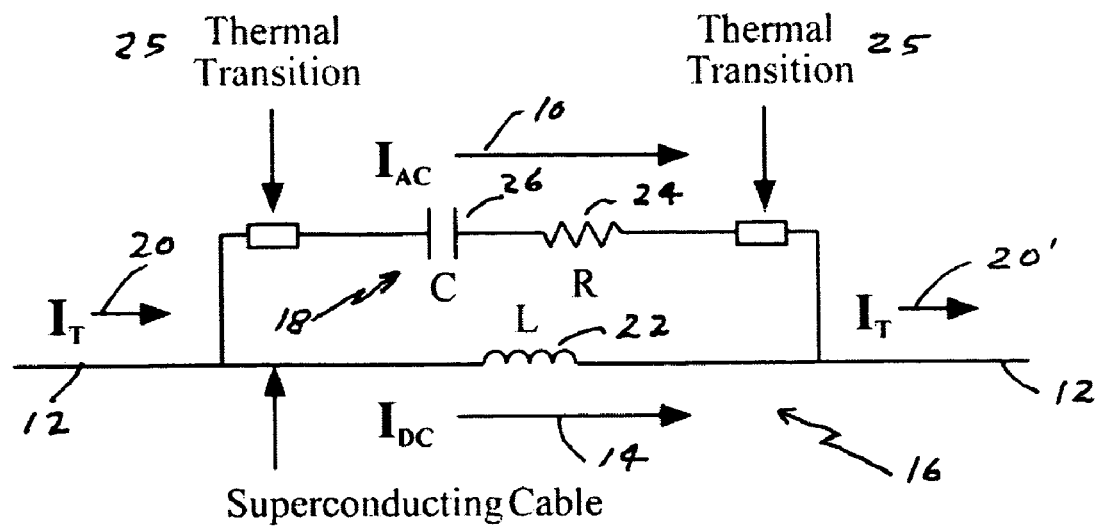
FIG. 3b is a variation of FIG. 3a providing a hybrid bypass cable network embodiment using a warm RC network in parallel with a cold inductive superconducting cable.
Figure 3C:
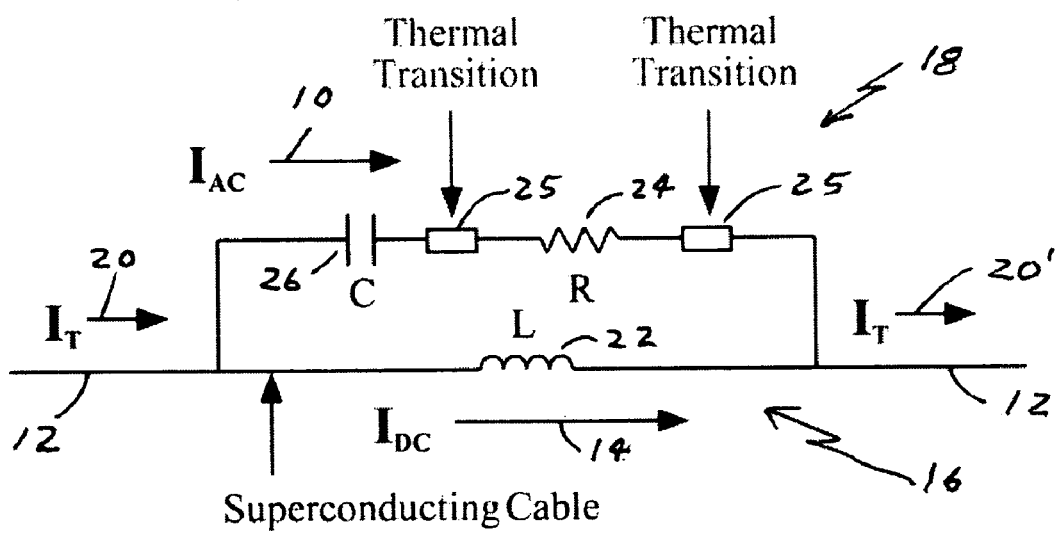
FIG. 3c is a variation of FIG. 3b providing a hybrid bypass cable network embodiment using cryo-capacitors (including superconducting capacitors) and warm resistors in parallel to the inductive superconducting cable.

In some cases, it is advantageous to block off all DC current in the AC bypass cable 18. This is accomplished by adding a capacitor 26 in series with the AC bypass cable 18 as shown in FIGS. 3a, 3b and 3c. Except for the capacitor 26, FIG. 3a is similar to FIG. 2a and FIG. 3b is similar to FIG. 2b. The capacitor 26 can be either at room temperature or at low temperatures. The advantages of using capacitors at low temperature or cryogenic temperatures include higher energy density, improved voltage capability, lower equivalent series resistance, higher quality factor, lower dissipation factor, improved frequency response, and improved current capability. The AC cable 18 can be at any temperature, but it may be best to bring the AC losses to room temperature in order to reduce the refrigeration requirement for the bypass 18. Cryogenic leads may be required to span the thermal transitions 25 of each device. The DC cable 16, a superconducting cable, must be operated below its critical temperature. The capacitor operates at whatever temperature is most accommodating in the design.

Hybrid Superconducting Ripple Filter Choke

A similar strategy can be applied for minimizing AC losses in superconducting chokes used in filter networks for power systems. In these power system applications the current consists of both a DC part and an AC part.

Figure 4:
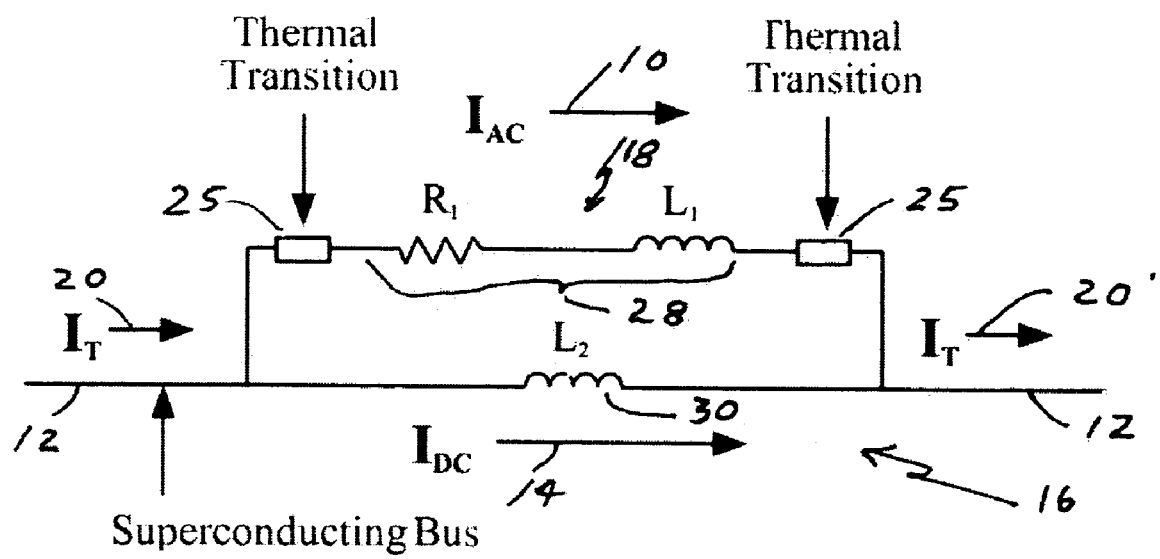
FIG. 4 is a Hybrid Superconducting Ripple Filter Choke in accordance with the invention.

Two coils (inductors) are used instead of two cables, an "AC coil" 28 and a "DC coil" 30 connected in parallel as shown in FIG. 4 and analyzed below. The AC coil 28 is an inductive coil having inductance $L_1$ and resistance $R_1$ fabricated with conductors (not necessarily superconductors). The impedance of the AC coil 28 dominates the circuit at frequencies higher than the ripple frequency, providing a lower impedance path than the coil 30 but still acting as a choke. The DC coil 30 is a superconducting coil, which is designed with a much higher inductance $L_2$ than the AC coil. The DC coil 30 passes the DC current 14 and minimizes the ripple current passing through it including most harmonics above the ripple current frequency.

The majority of the AC ripple current 10 passes in the AC coil 28, which absorbs most of the AC loss. This coil 28 can be held at any temperature, including either room temperature (300 K) or low or cryogenic temperature (i.e., 77 K). The remaining portion 14 of the current 20 (mainly DC) flows into the DC coil 30, which is held at a temperature below the critical temperature of the superconducting material and therefore has essentially no resistance to DC.

The AC component 10 of the ripple current 20 is mostly diverted from the superconducting DC coil 30, thereby minimizing AC losses in the superconductor. The DC current is conducted with practically zero losses. For applications where the power circuits are operated at low temperatures, if the AC coil is at room temperature, only the AC ripple current 10 must be passed through a cryogenic lead, a thermal transition from cryogenic to room temperature. In many cases, especially where there is a small AC current riding on a high DC current, this separation of currents reduces the overall heat loads associated with a choke inductor wound with superconductor material. The AC coil does not have to be held at room temperature but it is usually advantageous to do so to reduce refrigeration loads, even with the added heat loads due to thermal transitions.

Circuit Analysis for the Hybrid Superconducting Ripple Filter Choke:

AC Coil: $Z_1 = R_1 + \omega L_1$

DC Coil: $Z_2 = \omega L_2$

Combination: $\dfrac{1}{Z} = \dfrac{1}{R_1 + \omega L_1} + \dfrac{1}{\omega L_2}$ or $Z = \dfrac{(R_1 + \omega L_1)\omega L_2}{R_1 + \omega(L_1 + L_2)}$ If $L_2 \gg L_1$ then, $$Z = \frac{(R_1 + \omega L_1)\omega L_2}{R_1 + \omega L_2}$$

For high frequencies ($\omega L_2 \gg R_1$) the impedance is dominated by the AC coil ($Z_1$) so that, $Z = R_1 + \omega L_1$ For low frequencies ($\omega L_2 \ll R_1$) the impedance is dominated by the DC coil ($Z_2$), which approaches zero, $Z = \omega L_2 \to 0$ as $\omega \to 0$.

For a good design, the ripple frequency $\omega_{ripple}$ should be chosen at or above the crossover frequency, such that, $$\omega_{ripple} \geq \frac{R_1}{L_2}.$$

What is claimed is:

1. In a DC electrical circuit for reducing energy losses, said circuit flowing a direct current having alternating current components riding on said direct current, the improvement therein comprising:
   a direct current bypass network maintained at cryogenic temperature for carrying said direct current;
   an alternating current bypass network for carrying said alternating current components, said networks being connected in parallel,
   direct current power losses in said direct current bypass network being reduced by at least one of superconductive and cryogenically operated power components in said direct current bypass network, and alternating current power losses being reduced in said direct current bypass network by bypassing alternating current components through said alternating current bypass network, the input to said parallel networks equaling the output from said parallel networks.

2. The electrical circuit of claim 1, wherein the direct current bypass network includes one of a superconducting cable having inductance and a non-superconducting cable having inductance to reduce alternating currents flowing through said direct current bypass network.

3. The electrical circuit of claim 2, wherein said inductance includes self inductance and a series inductance.

4. The direct current bypass network of claim 2, wherein the superconducting cable includes superconducting material and is maintained at a temperature below a critical temperature of the superconducting material.

5. The electrical circuit of claim 1, wherein the alternating current bypass network has an impedance at frequencies of interest substantially less than impedance of the direct current bypass network.

6. The electrical circuit of claim 1, wherein the alternating current bypass network includes a resistance and a series-connected capacitor with an impedance at frequencies of interest substantially less than impedance of the direct current bypass network.

7. The electrical circuit of claim 1, wherein the alternating current bypass network includes an inherent resistance and an additional, pre-determined, series-connected resistor, a total impedance in the alternating current bypass network at frequencies of interest being substantially less than impedance of the direct current bypass network.

8. The electrical circuit of claim 1, wherein portions of the alternating current bypass network are maintained below room temperature.

9. The electrical circuit of claim 1, wherein portions of the alternating current bypass network are maintained at not less than room temperature.

10. The electrical circuit of claim 6, wherein the series connected capacitor is operated at cryogenic temperatures.

11. In a DC electrical circuit flowing a direct current having alternating current components riding on said direct current, the improvement therein comprising:

a direct current bypass network maintained at cryogenic temperature for carrying said direct current;

an alternating current bypass network for carrying said alternating current components, said networks being connected in parallel, direct current power losses in said direct current bypass network being reduced by at least one of superconductive and cryogenically operated power components in said direct current bypass network, and alternating current power losses being reduced in said direct current bypass network by bypassing alternating current components through said alternating current bypass network, the input to said parallel networks equaling the out put from said parallel networks, and wherein the direct current bypass network and the alternating current bypass network each include respective wound coils with respective inductances to form an alternating current ripple filter or choke.

12. The electrical circuit of claim 11, wherein the direct current bypass network includes a superconducting coil with self inductance and added series inductance, whereby said direct current bypass network has increased total inductance.

13. The electrical circuit of claim 11, wherein the direct current bypass network comprises a non-superconducting coil with self inductance and added series inductance, whereby said direct current bypass network has increased total inductance.

14. The electrical circuit of claim 12, wherein the superconducting coil includes superconducting material and is maintained at a temperature below a critical temperature of the superconducting material.

15. The electrical circuit of claim 11, wherein the alternating current bypass network is maintained at a temperature not less than room temperature.

* * * * *